INVENTOR.
WILLIAM T. ENGEL
BY
ATTORNEY

April 7, 1970 W. T. ENGEL 3,505,054
GLASS JOINT FORMING APPARATUS
Filed April 10, 1967 10 Sheets-Sheet 2

INVENTOR.
WILLIAM T. ENGEL
BY
*Norman N Wallace*
ATTORNEY

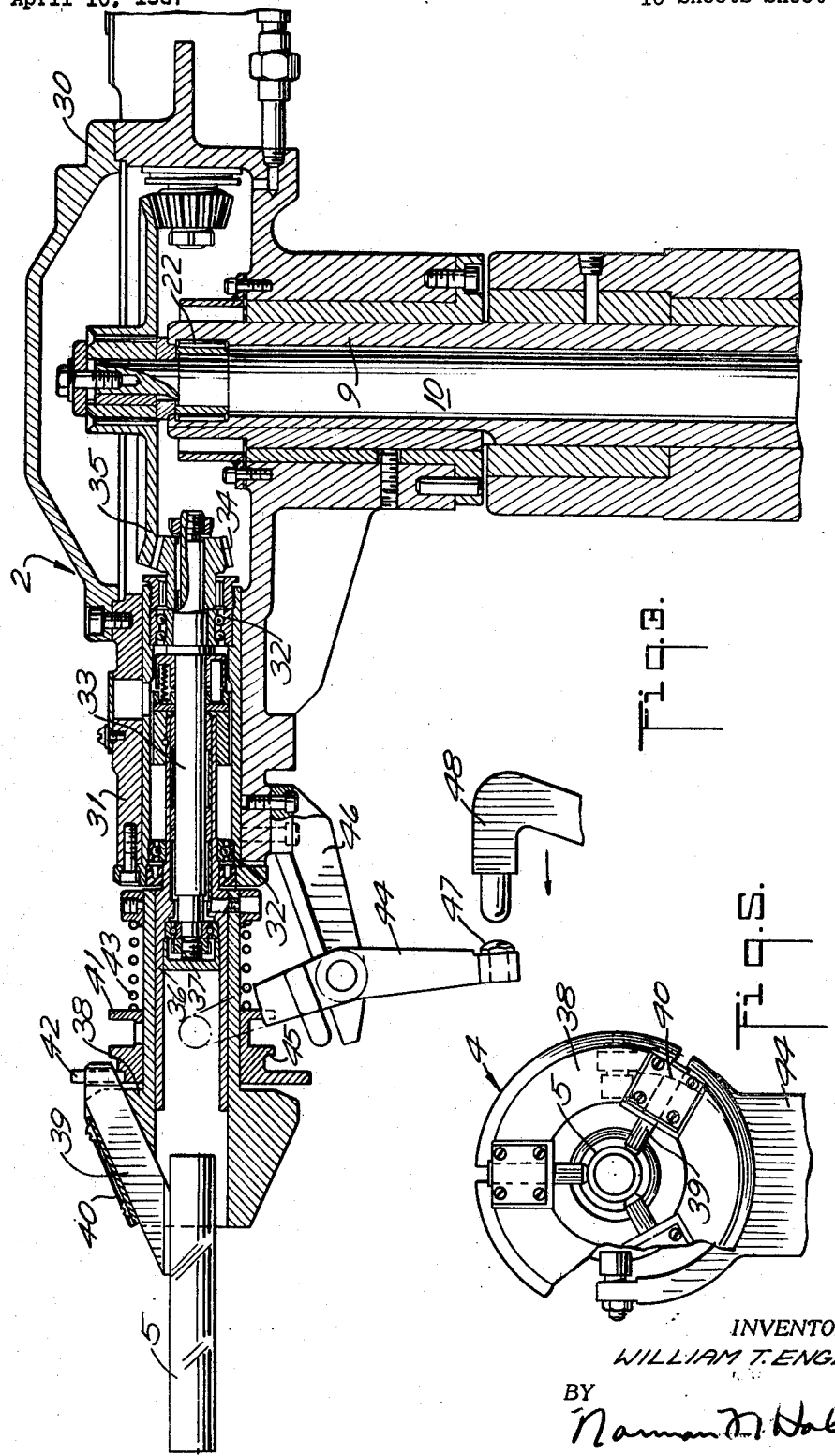

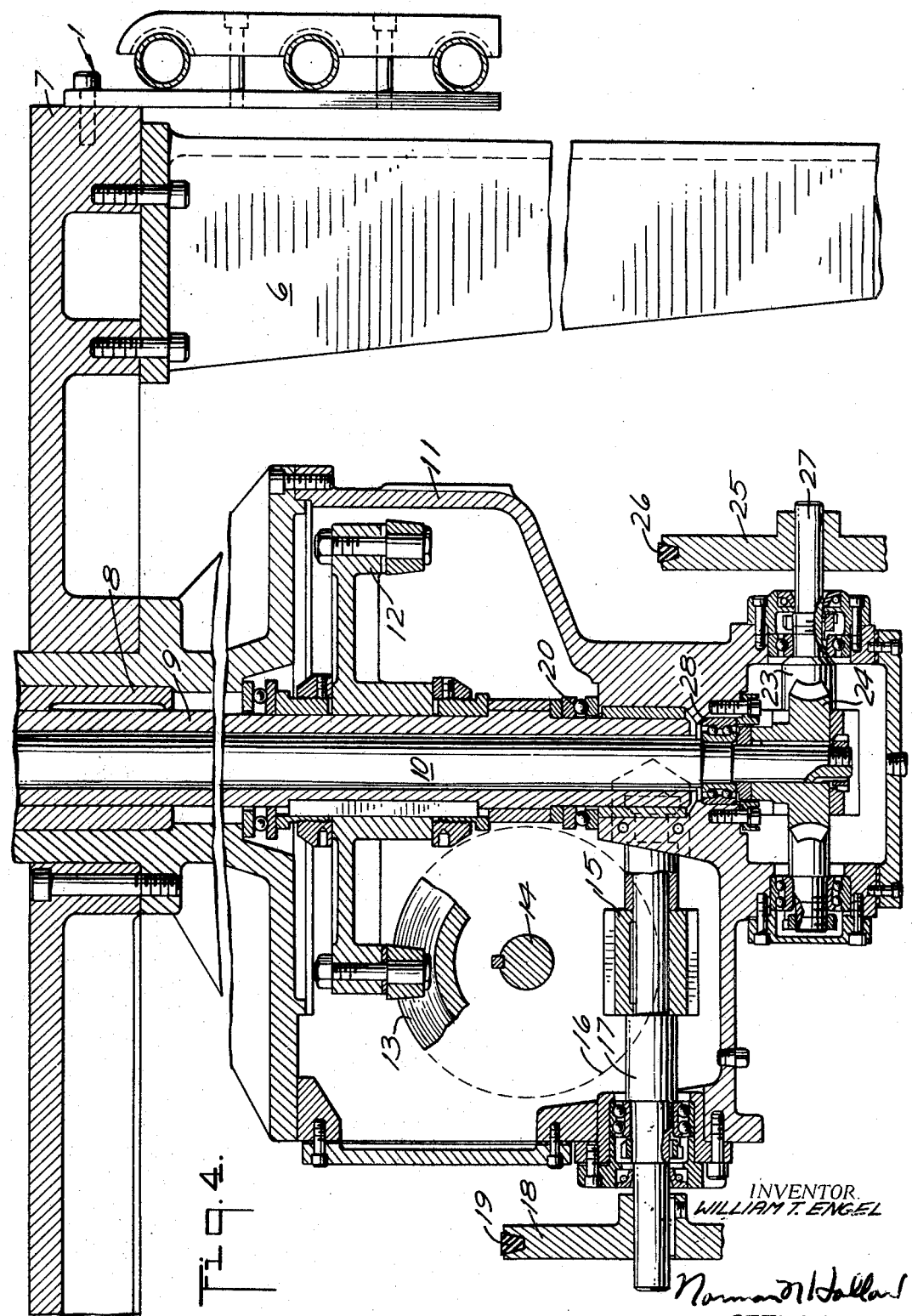

April 7, 1970   W. T. ENGEL   3,505,054
GLASS JOINT FORMING APPARATUS
Filed April 10, 1967   10 Sheets-Sheet 5
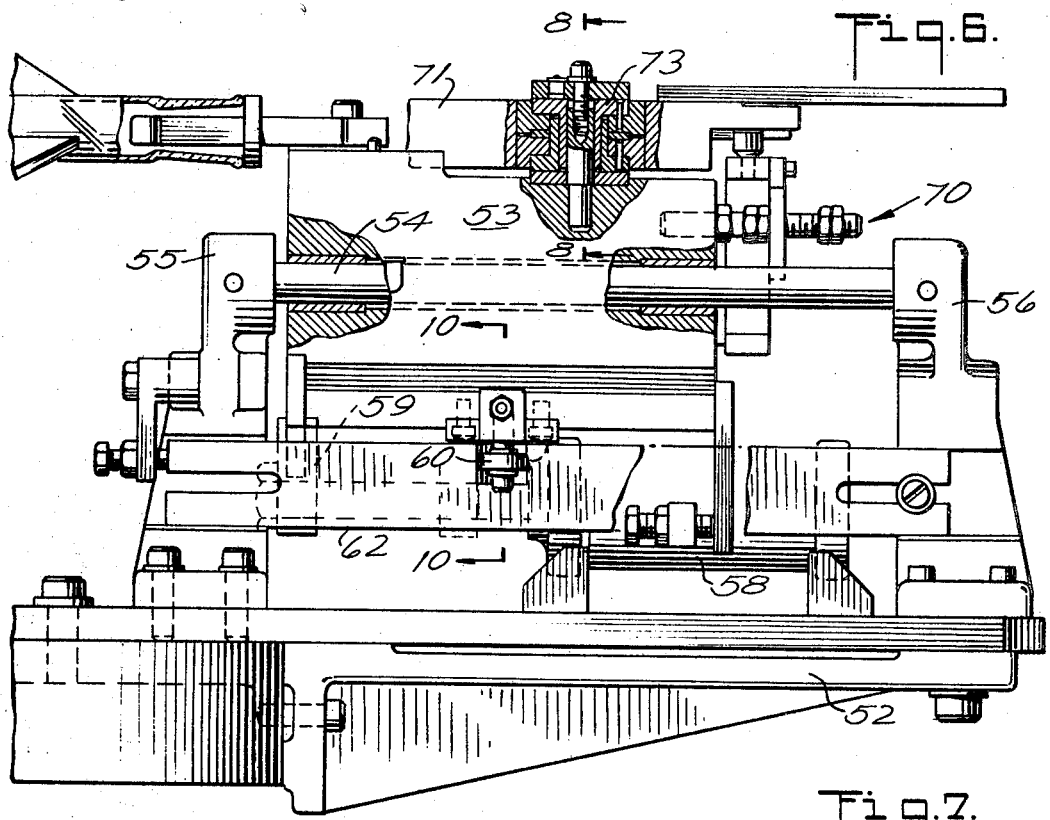
Fig.6.
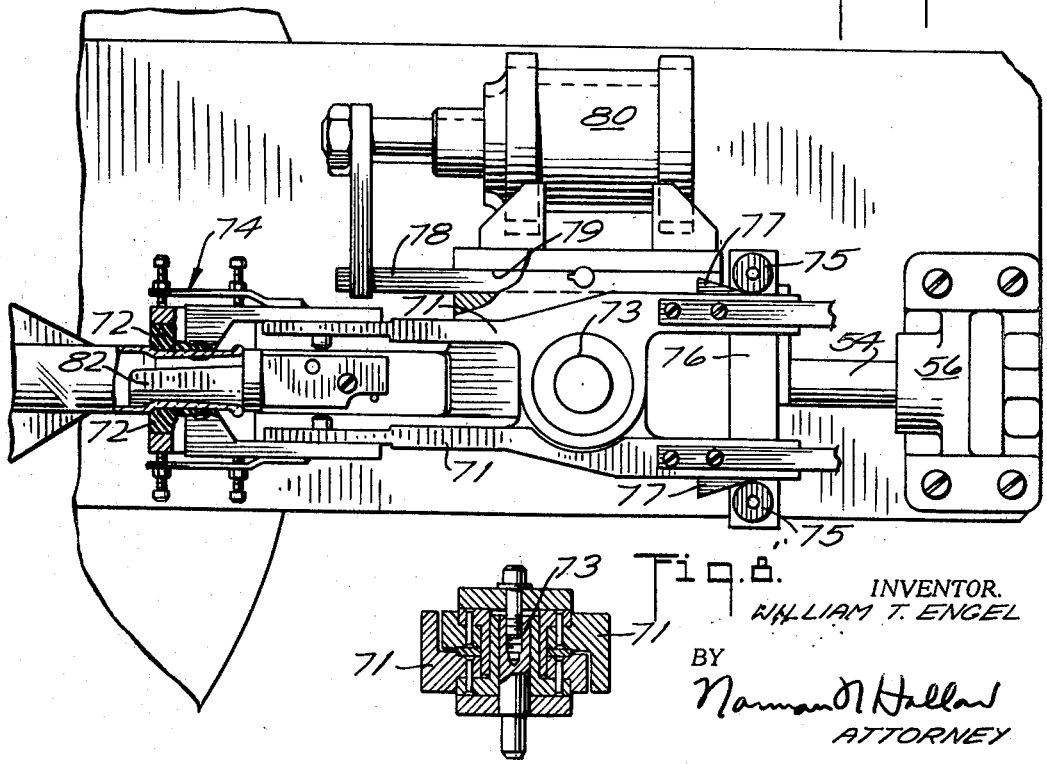
Fig.7.
Fig.8.
INVENTOR.
WILLIAM T. ENGEL
BY
Norman M Hallau
ATTORNEY

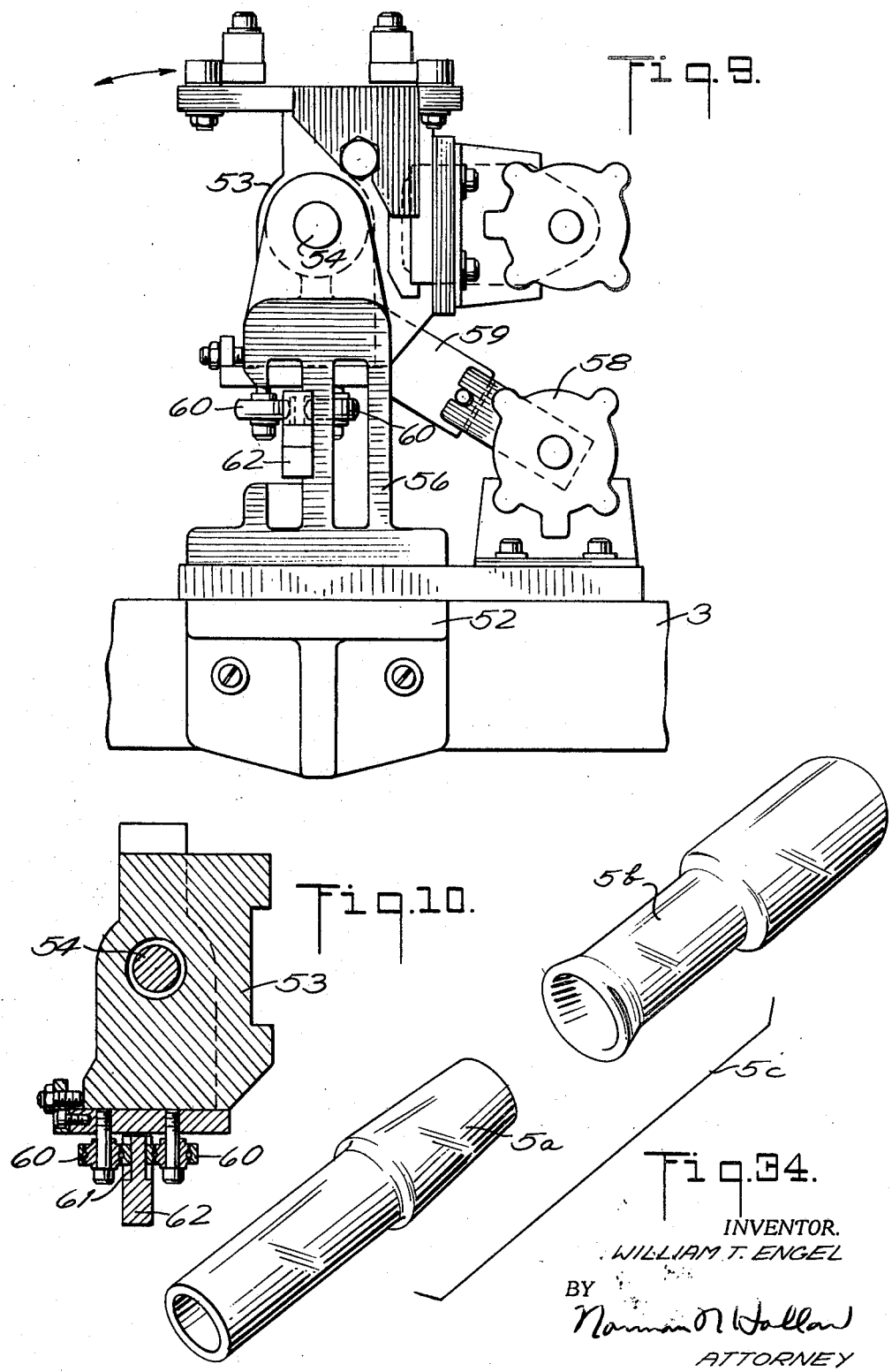

April 7, 1970     W. T. ENGEL     3,505,054
GLASS JOINT FORMING APPARATUS

Filed April 10, 1967     10 Sheets-Sheet 7

INVENTOR.
WILLIAM T. ENGEL
BY
ATTORNEY

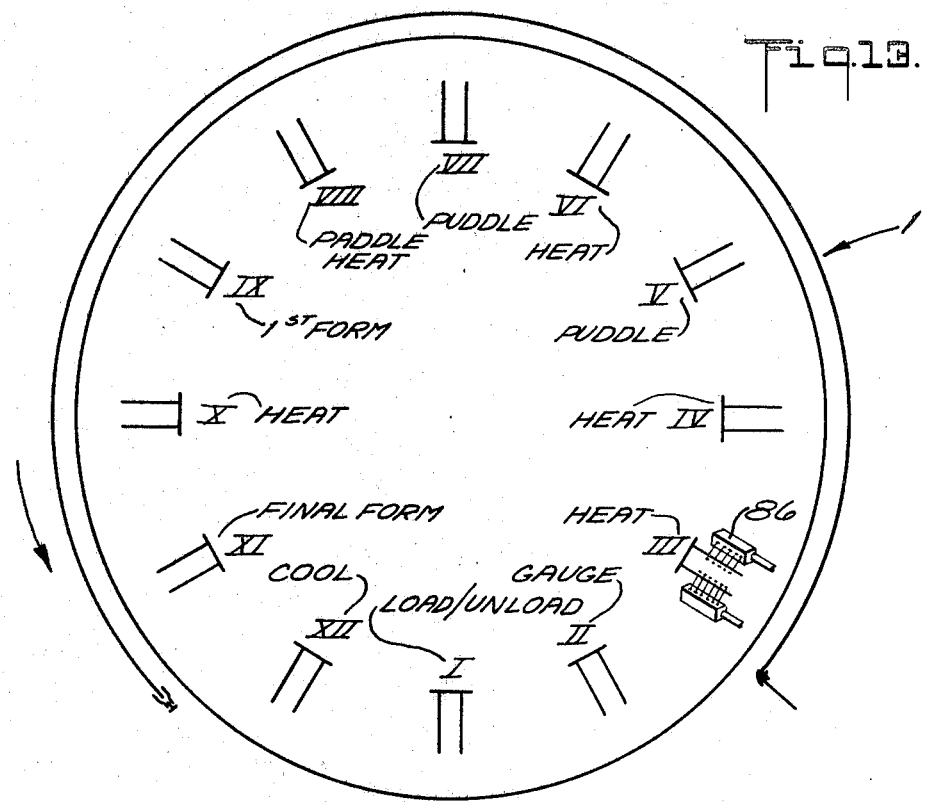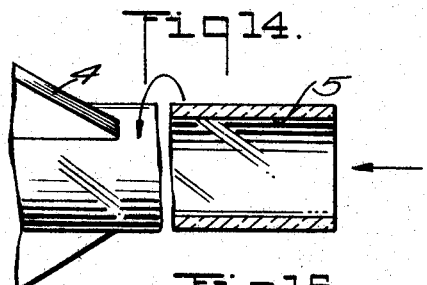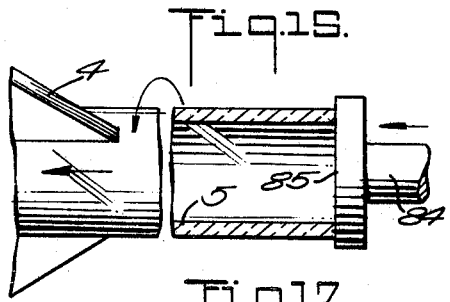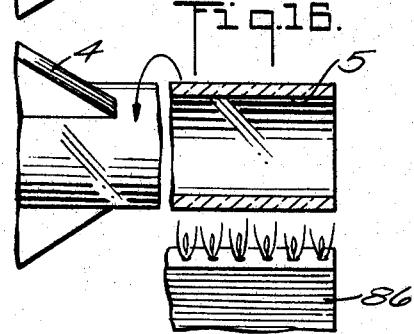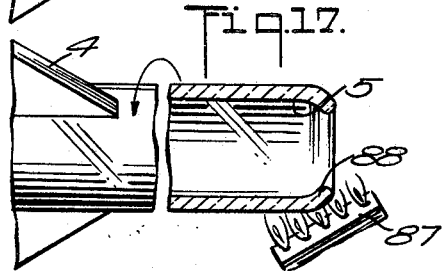
INVENTOR.
WILLIAM T. ENGEL
BY
ATTORNEY

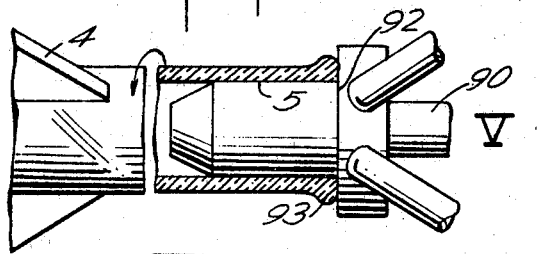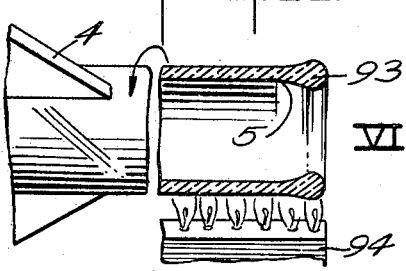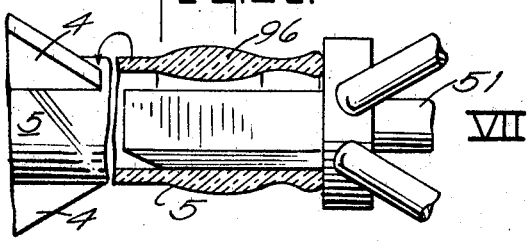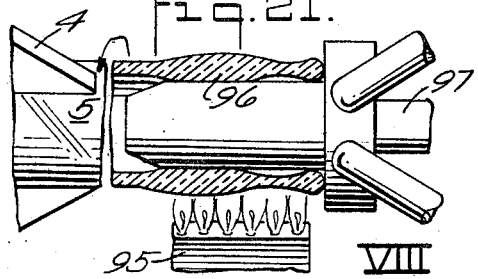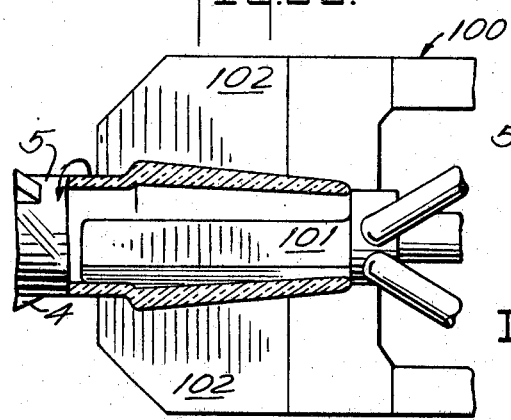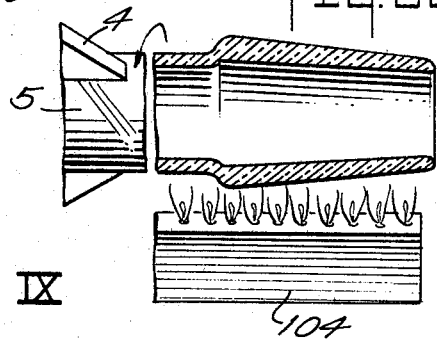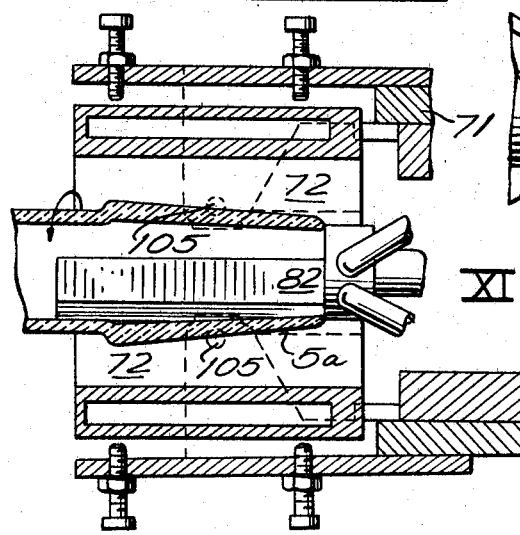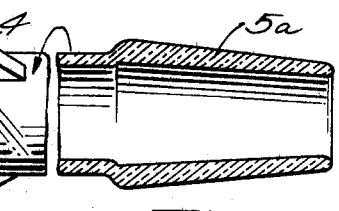
INVENTOR.
WILLIAM T. ENGEL
BY
ATTORNEY

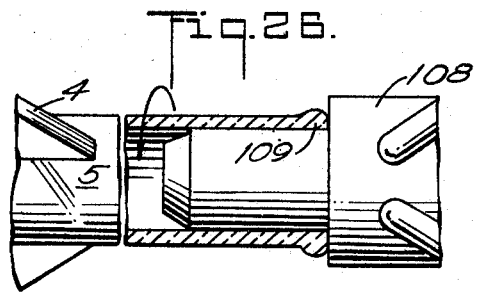
Fig.26.
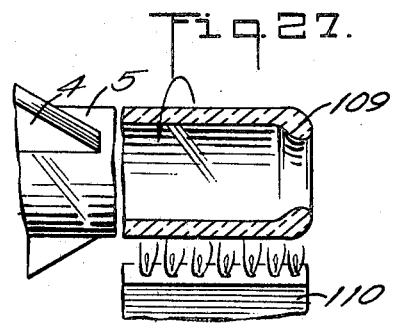
Fig.27.
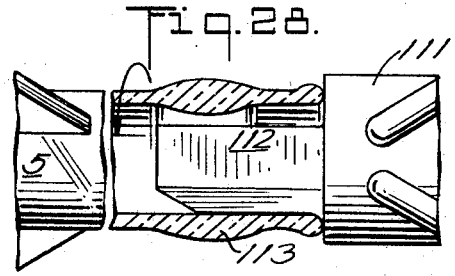
Fig.28.
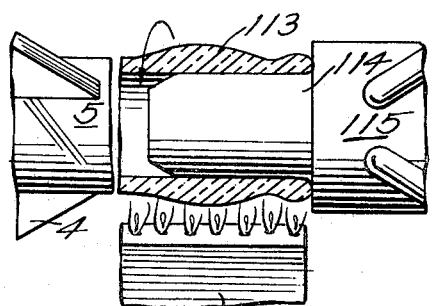
Fig.29.
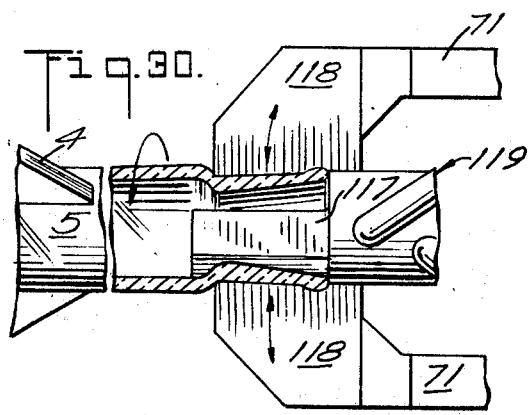
Fig.30.
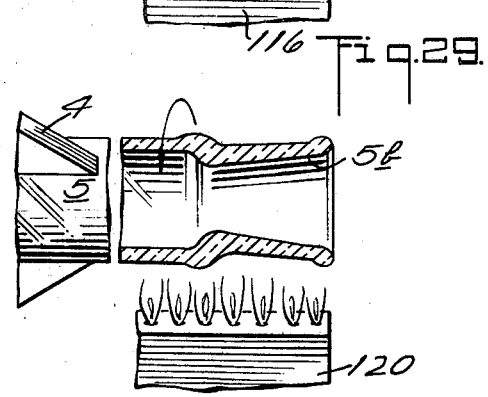
Fig.31.
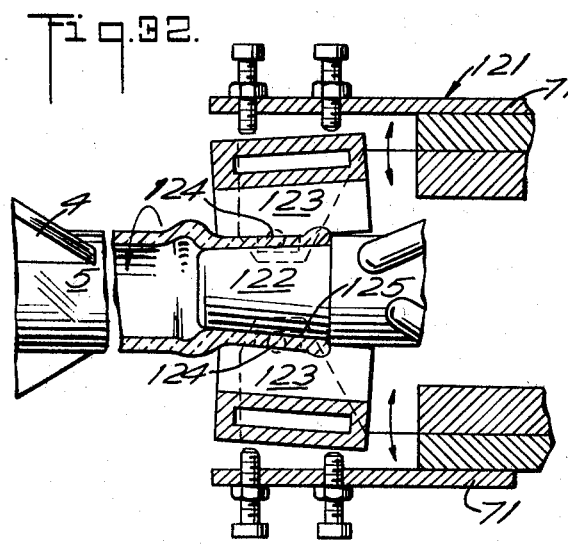
Fig.32.
Fig.33.
INVENTOR.
WILLIAM T. ENGEL
BY
ATTORNEY

United States Patent Office 3,505,054
Patented Apr. 7, 1970

3,505,054
GLASS JOINT FORMING APPARATUS
William T. Engel, Union, N.J., assignor to Kahle Engineering Company, Union City, N.J., a corporation of New Jersey
Filed Apr. 10, 1967, Ser. No. 629,685
Int. Cl. C03b 23/08
U.S. Cl. 65—277                                           15 Claims

ABSTRACT OF THE DISCLOSURE

An automatic machine for forming tapered joints on the ends of glass tubing including cooperating bell or spigot portions such as are used to couple sections of glass pipe together. The apparatus includes a series of chucks mounted on an intermittently advanced turret. Each chuck receives a section of glass tubing and presents this tubing successively to a series of forming stations where specially shaped tools in cooperating moving tool mountings combine to shape the end of the glass tubing into a bell or spigot shape or similar shape.

BACKGROUND OF INVENTION

The present invention relates to apparatus for shaping the ends of glass tubing to form joints such as tapered bells and spigots for coupling tubes or similar articles together. The formation of such glass joints is used in glass piping, for example, to attach pipe sections together and is also used for glass containers for providing removable stoppers. The present invention provides an automatic machine for precisely shaping such glass joints including, in particular, bell and spigot shapes which heretofore have been formed by hand operations. While most glass forming operations have now been mechanized or automated, the formation of certain shapes including those of bell and spigot joint shapes are still being largely done by hand due to certain unusual and difficult glass manipulating steps which are required in respect to such shapes. The machine of the present invention includes unique tools and tool mounting means which permit these steps to be performed mechanically and automatically at relatively high speeds and additionally in such a manner that the joints formed by the machine are precisely formed and identical to one another. This improves the performance of the joints made and insures complete interchangeability both of which advantages are not obtained in hand operations due to the inevitable and small but nevertheless significant differences which are always found in hand operations. The machine of the present invention includes a series of chucks or holders mounted on a turret for presenting sections of glass tubing to a series of shaping stations. The particular tools required to form either a bell or a spigot are mounted in these stations and the operation of the tools and the cooperating action of heating means between and at the stations which performs the glass shaping will be described in detail below.

Accordingly, an object of the present invention is to provide an improved means for shaping glass tubing.

Another object of the present invention is to provide an improved machine for automatically forming taper joints including bells and spigots in glass tubing.

Another object of the present invention is to provide an improved apparatus for automatically forming the elements of glass taper joints with precise and unvarying shapes.

Another object of the present invention is to provide automatic glass taper joint machine having relatively simplified form combined with reliable operation and adaptability for performing differing shaping operations.

Other and further objects of the invention will be obvious upon an understanding of illustrative embodiments about to be described or will be indicated in the appended claims, and various advantages not referred to herein will occur to one skilled in the art upon employment of the invention in practice.

DESCRIPTION OF DRAWINGS

A preferred embodiment of the invention has been chosen for purposes of illustration and description and is shown in the accompanying drawings, forming a part of the specification, wherein:

FIG. 3 is a vertical sectional view of the chuck mounting turret;

FIG. 4 is a vertical sectional view of the base and drive portion of the machine;

FIG. 5 (on sheet 3) is a front elevational view partially cut away of a glass tube holding chuck;

FIG. 6 is a side elevational view partially in section illustrating a shaping tool and the tool support and operating means;

FIG. 7 is a top plan view of the tool and tool support of FIG. 6;

FIG. 8 is a vertical sectional view of the tool support taken along line 8—8 on FIG. 6;

FIG. 9 is a rear elevational view of the tool support of FIG. 6;

FIG. 10 is a vertical sectional view of a tool support taken along line 10—10 on FIG. 6;

FIG. 13 is a diagrammatic illustration of the 12 heating and shaping stations positioned around the machine turret;

FIGS. 14–25 are enlarged illustrations of the successive heating and forming operations as applied to a glass tube in the forming of a typical tapered spigot on the glass tube;

FIGS. 26–33 are enlarged illustrations of the successive heating and forming operations as applied to a glass tube in the forming of a typical bell; and FIG. 34 (on sheet 6 adjacent FIG. 10) is an enlarged perspective view of a spigot and a bell formed on adjacent ends of glass tubes.

DESCRIPTION OF THE PREFERRED EMBODIMENT

Figure 1:
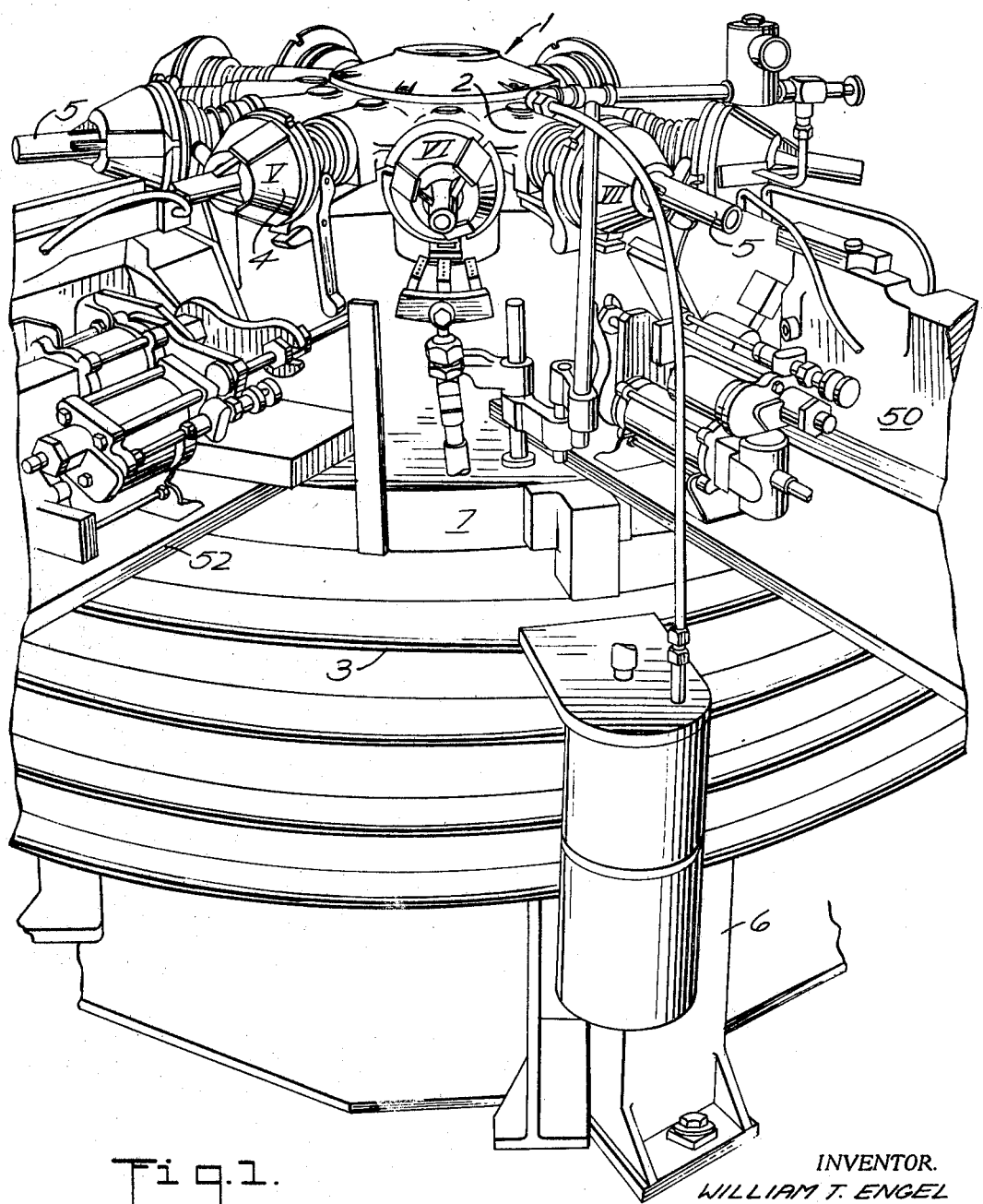
FIG. 1 is a perspective view of a preferred embodiment of a taper joint machine in accordance with the present invention.

The joint forming machine will first be described generally with particular reference to FIGS. 1–4 and FIG. 13.

As best seen in FIGS. 1–4, the machine 1 has an upper turret 2 mounted for rotation on a base 3 and has a series of tube holding chucks 4 positioned in a radial array so that the chucks 4 may successively present glass tubes 5 to a series of heating or forming stations I–XII positioned around the periphery of the turret 2.

As seen in FIGS. 3 and 4, the machine 1, base 3 has support members 6 and a top 7 which includes a bearing 8 for rotatably supporting a hollow turret support shaft 9.

Two separate independent drive motions are provided for the turret 2. The first of these is a drive for continuously rotating each of the tube holding chucks 4. The second drive steps the turret to advance chucks 4 to the various forming and heating stations. To provide these separate drives, the turret support shaft is formed with a solid central chuck rotating shaft 10 positioned within the turret support shaft 9.

FIG. 4 illustrates a hollow oil filled drive housing 11 within the machine base 3 which houses the drive couplings for the indexing shaft 9 and the chuck rotating shaft 10. The indexing movement for the hollow turret support shaft 9 is provided by a roller drive including a roller wheel 12 and worm 13 on the indexing shaft 14. Worm 15 and pinion 16 couple the shaft 14 through the intermediation shaft 17, pulley 18, and belt 19 to a suitable drive motor. A thrust bearing 20 mounted within the drive housing 11 provides vertical support for the indexing shaft 9. Bearings 21 and 22 (FIG. 3) support the chuck rotating shaft 10. The chuck rotating shaft 10 is continuously driven by a second drive motor to provide constant rotation of the chucks 4 through the intermediation of worm 23, pinion 24, pulley 25, and belt 26 on shaft 27.

FIG. 3 illustrates the details of the turret 2. The several chucks 4 are supported on a hollow hub 30 coupled to the upper portion of the indexing shaft 9 and having a series of radially aligned hollow spokes 31 for supporting chuck mounting bearings 32 and chuck drive shafts 33. The central chuck rotating shaft 10 is operatively coupled to all of the chucks 4 to turn them in synchronism and continuously by the drive means described above through the intermediation of bevel gears 34 and 35 and the drive shafts 33.

The above described turret mounting and drive system is seen to provide a means of intermittently stepping the turret 2 and its attached chucks 4 the proper distance to successively present the glass tubes 5 in the chucks 4 to the various stations I–XII illustrated in FIG. 13 and which will be further described below. The chuck rotating means described above is seen to provide for a continuous rotation of the individual chucks 4 both during and between the stepping movements.

The tube supporting chucks

The tube supporting chucks 4 each slidably receive a length of glass tubing 5 and grip the length of tubing 5 to permit its axial positioning within the chucks 4. The chucks 4 rotate continuously as described above as they are indexed station to station. A preferred form of the chuck 4 is shown in detail in FIGS. 3 and 5. Each chuck 4 includes a central hub 36 which is attached to the chuck drive shafts 33 at 37. This central hub 36 slidably mounts three finger mounting sections 38 which cooperate to slidingly support three tube gripping fingers 39 angularly aligned to the shafts 33 to grip the tubes 5. These fingers 39 are slidably mounted between the sections 38 underplates 40 and are yieldably urged into engagement with the tubes 5 by being coupled to a common spring loaded collar 41 by coupling pins 42. A compressed coil spring 43 forces the collar 41 outwardly of the chuck providing a corresponding outward and downward movement of each of the fingers 39 through the intermediation of the coupling pins 42.

In order to open the chuck fingers 39 for the tube loading and removing operation, a crank 44 has its outer end pivotally attached to a slot 45 in rotating collar 41. The crank 44 is pivotally attached to a suitable support bracket 46 and it is rotated to its chuck opening position by the engagement of a lower cam button 47 on the crank 44 by a camming lever 48 which may be hand operated or powered by a motor such as an air motor.

The tool holders

As described elsewhere herein, the glass tubes 5 which are being shaped are moved successively to several shaping stations where the forming tools are moved into engagement with rotating glass tubes 5. There are two basic tool motions required so that the tool holders each have one of two basic designs.

A first tool holder is used which provides an essentially radially inwardly directed movement of the tool toward the glass tubes 5 with or without a final motion of the tool against the tubes. The tools used, for example, to gauge or position the glass tubes 5 in the chucks 4 and certain puddling tools require only this movement radially of the turret 2. Such a tool holder is illustrated at 50 in FIG. 2 which has a puddling tool 51 mounted at its upper inward corner. These tool holders 50 are mounted upon outwardly extending brackets 52 bolted to the machine base 3 for providing a support for the tool holder and its associated drive cylinders. The tool holder 50 itself comprises a carriage 53 slidably mounted on a support rod 54 fastened between inner and outer support brackets 55 and 56. The carriage 53 is moved radially inwardly to the tool operating position and is returned to its inoperative position by the piston 57 of an air cylinder 58 which is attached to the carriage 53 by a coupling bracket 59. The carriage 53 is held in vertical alignment on its mounting rod 54 with the tool 51 in the proper position by pair of guide rollers 60 mounted on its lower portion and engaging a cam surface 61 on a stationary cam bar 62 (FIG. 10). The air operated drive cylinder 58 is controlled by a suitable electrically controlled air valve 63 timed by a cam or a cam shaft (not shown) mounted in the machine base and conveniently driven from the indexing drive so that the movement of the tool by the tool carriage is properly synchronized with the above described indexing of the turrent. The various tools operated by the above described tool holder and their action in forming a bell or spigot on the end of a glass tube 5 will be further described below under the section entitled "Detailed Description of the Heating and Shaping Steps." Where the tool is moved against the inner side wall of the glass tube 5, the cam surface 61 is shaped to rock the carriage 53 on the rod 54 to provide this movement of the tool.

Another embodiment of the tool holder is used on several other stations where the tools used at the stations require a clamping or die pressing action in addition to the tool movements radially and circumferentially of the turret 2. These tool holders utilize the same basic carriage design as described above but include an additional tool closing mechanism which is best illustrated in the tool holder 70 shown in FIGS. 6, 7, and 8. These tool holders include parts similar to those described above for tool holder 50 and these parts are similarly numbered, i.e. they are also mounted on outwardly extending brackets 52 and they have similar carriage 53 mounted on a radially extending support rod 54 held between an inner bracket 55 and an outer support bracket 56. The radial motion of the carriage is similarly provided by an air cylinder 58 similarly coupled to the carriage 53 by the connecting bracket 59. The movement of the tools radially of the rotating tubes 5 is similarly provided by cam wheels 60 attached to the lower edge of the carriage 53 as best seen in FIG. 10 and which ride on a suitably shaped cam bar 62.

The tool carriage 53 as best seen in FIG. 8, includes an additional tool element consisting of a pair of spaced tool holding arms 71 adapted to be moved radially inwardly of the rotating tube to move forming die blocks 72 against the outer surfaces of the tubes 5 to cooperate with the inserted mandrel portions of the tools within the tubes 5. These arms are pivotally attached at 73 the top rear portion of the tool carriage 53. After the glass forming tool 74 has been moved radially inwardly to its shaping position with respect to a glass tube 5, the forming die blocks 72 on the arms 71 are swung into engagement with the glass tube 5 by the action of a pair of cam rollers 75 on a camming head 76 which engages cooperating cam blocks 77 on each of the arms 71.

The camming head 76 is slidably mounted on the carriage 53 on a horizontal slide bar 78 which is contained in a suitable bearing 79 on the side of the tool carriage 53. A second drive motor or air cylinder 80 moves the slide bar 78 and the attached cam head 76 back and forth for the closing and opening operation of the arms 71 under the control of a suitable cam on the same cam shaft which controls the tool moving air cylinders 58.

Figure 11:
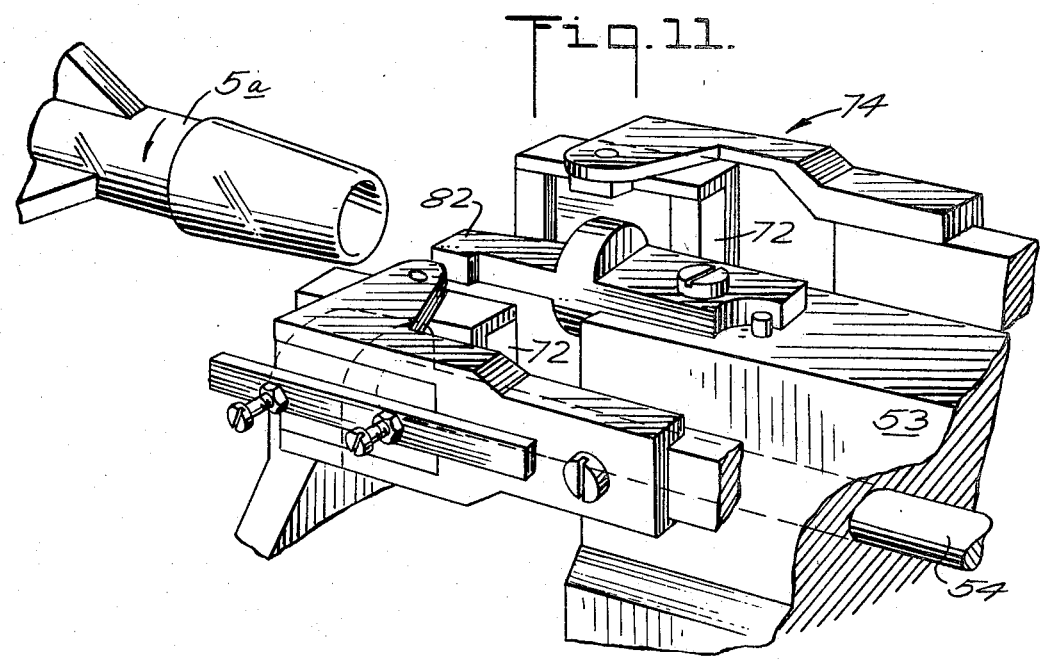
FIGS. 11 and 12 are fragmentary enlarged perspective views of the tool holder of FIG. 6 illustrating a shaping operation of a forming tool.
Figure 12:
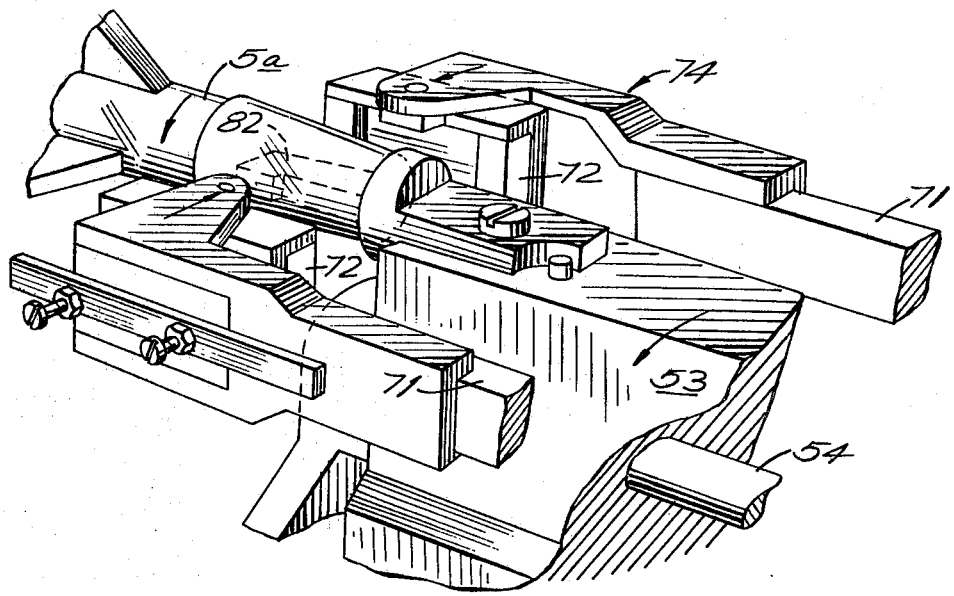

FIGS. 11 and 12 illustrates successive movements of the tool holder 70 elements for a tool 74 for providing a compound motion for the center mandrel portion 82 of the tube 5 both axially and circumferentially with respect to the tube 5 and which also provides for the scissor-like or gripping action of the die blocks 72 or other tool elements against the outer walls of the tube 5.

FIG. 11, for example, illustrates the final shaping tool 74 for the spigot shaping operation, described more fully herein in connection with the description of FIGS. 14–25. This final shaping tool 74 includes the central mandrel 82 also illustrated in FIG. 22 and which is mounted on the tool carriage 53 for being first carried axially into the rotating tube and which is then moved against the inner wall of the tube by the cam controlled rocking of the carriage 53 described above.

FIG. 12 shows the tool carriage 53 in its inward position and illustrates the outer die blocks 72 being swung inwardly against the rotating glass tube 5 for the final shaping operation under the action of the camming head 76 (FIG. 8).

DETAILED DESCRIPTION OF THE HEATING AND SHAPING STEPS

The shaping apparatus as described above is seen to be adaptable for a variety of shaping operations. A set of tools is chosen and mounted on the tool holders in accordance with the particular joint being performed. FIG. 13 shows the typical arrangement of the twelve stations which may be used for forming either a bell or spigot on the end of a glass tube. The particular tools used at the stations and the exact positioning of the heating elements is chosen depending upon whether a bell or a spigot or other shape is being formed.

FIGS. 14–25 illustrate the forming steps and the forming tools where the twelve stations are being used to form the spigot portion 5a of a pipe joint 5c (FIG. 34).

FIG. 14 corresponds to the loading and unloading station I where the length of glass tubing 5 is being inserted into or removed from a chuck 4. The chuck 4 has been opened at this point by rotation of the above described crank 44 by a suitable foot treadle or an air motor activated by the machine operator. The glass tube is slipped into the open jaw but is not moved all the way into its final position. The turret 2 now indexes carrying the tube 5 to station II which is the gauging station. At station II, a gauging tool 84 with the general form illustrated in FIG. 15 is mounted on a tool holder 50 of the type illustrated in FIG. 2 and described above. The tool carriage 50 moves radially inwardly causing the face 85 of the gauging tool 84 to engage the end of the glass tube 5 to slide it radially inwardly to the desired forming position in the chuck 4. This inward movement of the tube 5 can be performed since the tool gripping fingers 39 as illustrated in FIG. 3 will slide radially inwardly as the gauging tool 84 presses against the end of the tube 5. The coil spring 43 which is holding the fingers 39 in place is slightly compressed to permit this positioning of the tube 5.

The turret 2 now indexes to carry the chuck 4 successively to heating stations III and IV. At station III the entire exposed end of the tube 5 is heated by strip-type burner 86 and at station IV the heat is more specifically directed against the end of the tube burner 87 to cause a puddling of glass at the end portion of the tube 5 as illustrated at 88 in FIG. 17.

The heated tube 5 is now ready for an initial tool shaping or tool puddling which is performed at station V by a puddling tool 90 mounted on a tool holder 50 which moves the puddling tool surface 91 into engagement with the end 92 of the glass tube 5 as shown in FIG. 18. A significant enlargement or puddling 93 of the glass now results at the end portion of the tube 5.

The turret 2 now steps again to carry the tube 5 to a further heating station VI where heating flames from a heater 94 are directed against exposed portions of the tube including the puddled end portion 93 and additional areas further from the tube end. A further puddling is now performed at station VII with a puddling tool 51 shaped as illustrated in FIG. 20 and with a single shaping surface engaging the interior of the rotating tube 5. This arrangement forms a thickened portion 96 in a zone remote from the tube mouth.

In the automatic formation of tapered glass joints including both the spigot and bell as described herein, the best results obtained where the tapered shape is facilitated by the formation of a thickened zone in the glass tube at a point spaced back from the tube end as illustrated, for example, in FIG. 18 at 96 for the spigot. This result is facilitated by the use of the general puddling tool shapes illustrated for tools 51, 90, and 97 including the end puddling surfaces on the tools and the inward extending mandrels. The tools and tool holding arrangements of this machine facilitate this important step in the automatic formation of the tapered glass joints.

After another index of the turret 2, a final combined heating and puddling step is performed at station VIII with a heater 95 and puddling tool 97 as illustrated in FIG. 21 and in which the center portion of the tool is initially spaced from the inner walls of the glass tubing 5 to permit a thickening or puddling of the glass tubing in areas 96 spaced radially inwardly from the tube walls.

A sufficient thickening of the necessary portions of the tube 5 has now been obtained by the above described puddling steps to permit an initial shaping of a spigot 5a by means of the first shaping tool 100 at station IX as illustrated in FIG. 22. This tool 100 includes a shape center mandrel portion 101 and cooperating pressing die blocks 102 for engaging the outsides of the rotating tube 5. This tool 100, as well as the above described puddling tools and other tools are water cooled to keep the tool temperature well below their melting point.

After an additional heating by heater 104 of the partially formed spigot at station X, the turret 2 presents it to a final forming station XI where a final shaping tool 74 including a center mandrel 82 and cooperating outer die blocks 72 perform the final shaping of the rotating tube 5. It has been found that better results are obtained where the outer die blocks 72 are pivotally mounted at 105 on arms 71 to permit them to accommodate themselves to slight initial variations in the shaping of the glass tube end. The final shaping tool is also preferably water cooled to keep the temperature below that of the hot glass.

The fully formed spigot 5a is now stepped to a final cooling station XI to assure that the glass cools to a form retaining state before the completed spigot 5a is moved back to the unloading station 1.

FIGS. 26 through 33 illustrate the preferred steps and tools for forming a bell 5b at the end of a tube 5 to cooperate with a spigot 5a of the type described above in forming a joint 5c (FIG. 34). The forming operation includes basically the same steps, however, the different shape of the bell requires a thickening of the glass in differing zones and a corresponding change of the shape of the forming tools. The initial loading, gauging and heating steps at stations I, II, III and IV are similar to those described above in connection with the formation of the spigot 5a.

FIG. 26 illustrates a first puddling operation on the heated end of the tube 5 at station V with a water cooled puddling tool 108 being pressed into engagement with the end of the glass tube 5. The central poriton of this puddling is proportioned to retain the initial diameter of the bore of the tube 5 while thickening the glass at the edge of the tube to form a bead 109 as illustrated in FIG. 26.

After an additional heating by heaters 110 at station VI as illustrated in FIG. 27 and where a further puddling results at the glass bead 109 at the end of the tube 5, a further puddling or thickening of the glass is performed at station VII by the puddling tool 111 illustrated in FIG. 28. In a preferred embodiment of this tool, the inner mandrel 112 is positioned against only one side of the tube 5 during the puddling and rotational movement of the tube. A significant additional puddling of glass at 113 occurs to provide material for the inner tapered bore for forming a good glass joint having certain critical zone thicker than the original tubing. A final combined puddling and heating step by heater 116 is illustrated in FIG. 29 for station VIII where a center mandrel 114 of this puddling tool 115 is proportioned at the desired tube bore and where the outer edge of the glass tube is pressed sufficiently to provide an additional thickening of the glass in the proper zones both at the edge and a zone spaced from the tube edge.

The first forming operation at station IX is illustrated in FIG. 30 where tool 119 with a shaped center mandrel 117 provides an initial bell shape in combination with outer die blocks 118 positioned on the opposite sides of the tube 5 to control the shape imparted by the cooperating mandrel 117 and jaws 118. An additional heating of the partially shaped bell is performed by heater 120 at station X.

The final shaping of the bell 5b is done at station XI preferably using the tool 121 as illustrated in FIG. 32. This tool 121 includes a tapered central mandrel 122 for precisely providing the desired tapered inner mouth of the bell 5b. A pair of cooperating outer forming die blocks 123 are moved into position by the outer tool holding arms 71 described above. These dies 123 are also preferably pivotally mounted at 124 to permit them to initially conform to the shape of the outer portion of the bell from station IX as it has been found that such pivotally mounted dies cooperate with the center mandrel to insure a more accurate formation and better retention of the necessary tapered shape of the critical inner bore 125 of the bell portion 5b of the joint 5c.

FIG. 33 illustrates the completed bell 5b at the cooling station XII in its final form preparatory to its being unloaded from the machine at station I.

Figure 2:
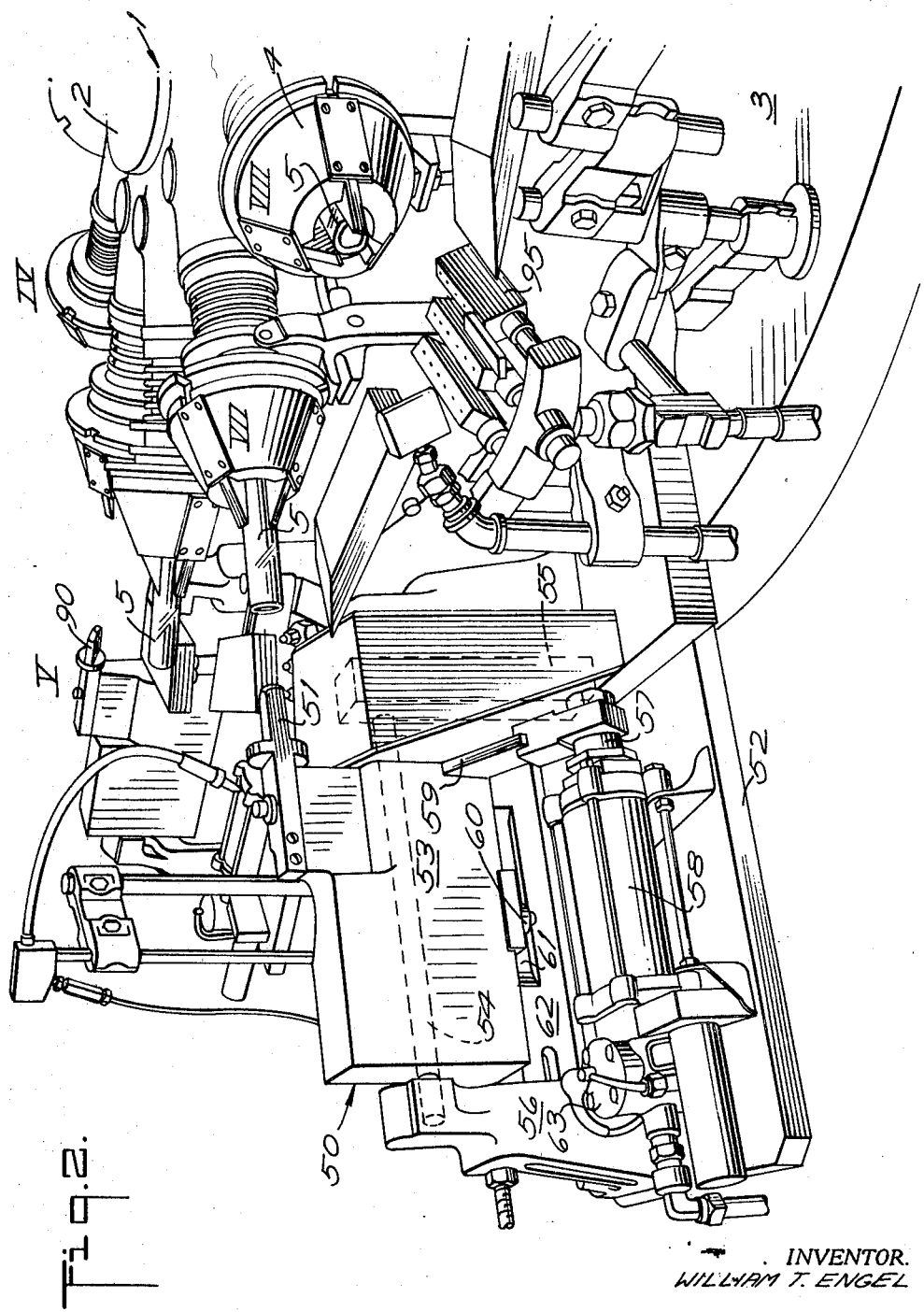
FIG. 2 is a fragmentary perspective view of the machine in FIG. 1 illustrating a tube forming station and a tube holding chuck.

Carbon blocks 126 having flat upper surfaces are illustrated in position intermediate certain of the puddling stations such as stations VI, VII and VIII (FIG. 2). These blocks are provided so that the rotating glass tube 5 will be supported by the blocks as the tubes are stepped from station to station for preserving the shape of the hot glass tube at that place and for preventing its sagging during the stepping movement.

It will be seen that an improved glass shaping apparatus has been provided, particularly adapted for the automatic and relatively high speed forming of tapered glass joints or similar glass shapes formed on glass tubing. The apparatus is seen to provide an automatic method of forming relatively difficult shapes which heretofore have been principally formed by hand forming operations. The apparatus of the invention in addition to being automatic is also clearly adaptable for use in providing a variety of different shapes at the ends of glass tubes with relatively minor adjustments in the apparatus and simple changes in the tools used in the shaping operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. A machine for forming tapered coupling end portions on sections of glass tubing initially having relatively thin walls of substantially uniform thickness comprising the combination of a rotatably mounted turret, a plurality of glass shaping means spaced around the periphery of said turret, a plurality of glass tube holders on said turret, drive means for providing an intermittently stepped advance of said turret for moving said holders between said shaping means, at least one of said shaping means comprising a heater directed onto the glass tubes for puddling glass at a zone at the ends of the tubes in said holders, a second shaping means subsequent to said one shaping means comprising an additional heater and puddling means for puddling the glass tube at zones spaced from the ends of the glass tubes, and a third shaping means subsequent to said second shaping means including a shaping die for forming an outwardly flared surface on the tube and defined by a tube wall of decreasing thickness axially outwardly of the tube and at said puddled zones.

2. The machine as claimed in claim 1 in which said second shaping means comprises a flat shaping surface positioned for engaging the glass tube ends and a second shaping surface extending axially of the tubes for engaging the tube inner walls.

3. The machine as claimed in claim 1 in which said third shaping means comprises a flat shaping surface for engaging the tube ends, a second shaping surface extending axially of the tubes for engaging the tube inner walls, and a pair of dies positioned for engaging opposed outer surfaces of the glass tubes.

4. The machine as claimed in claim 1 in which said third shaping means comprises a flat shaping surface for engaging the tube ends, a second shaping surface extending axially of the tubes for engaging the tube inner wall, a pair of dies mounted for engaging opposed outer surfaces of the glass tubes, and said dies being mounted on pivots for movement about axis perpendicular to the axes of said glass tube.

5. The machine as claimed in claim 1 in which said tube holders comprise chucks rotatably mounted on axes oriented radially of the axis of said turret, said chucks including resiliently mounted glass tube engaging fingers aligned with an inward flare for facilitating the movement of the tubes inwardly of the chucks.

6. The machine as claimed in claim 1 in which said tube holders comprise chucks rotatably mounted on axes oriented radially of the axis of said turret, said chucks including resiliently mounted glass tube engaging fingers, and drive means for continuously rotating said chucks.

7. Means for forming tapered coupling portions at the ends of glass tubes initially having relatively thin walls of uniform thickness comprising the combination of a plurality of spaced glass forming means, means for successively presenting glass tubes to said forming means, one of said forming means comprising heating means for puddling the glass at the tube ends, a second forming means succeeding said one forming means comprising means for puddling and thickening a zone of the glass tubes spaced from the tube ends, with a third forming means succeeding said second forming means comprising means for forming a tapered zone in the wall of said tubes having a decreasing tube wall thickness radially of the tubes towards the tube ends from a maximum thickness greater than the initial wall thickness.

8. Means for forming tapered coupling portions at the ends of glass tubes initially having relatively thin walls of uniform thickness comprising the combination of a plurality of spaced glass forming means, means for successively presenting glass tubes to said forming means, one of said forming means comprising heating means for puddling the glass at a first zone at the tube ends, a second forming means succeeding said one forming means comprising means for puddling and thickening a zone of the glass tubes spaced from the tube end, and a third forming means succeeding said second forming means comprising die means for forming a tapered zone in the wall of said tubes at said zones having a decreasing tube wall thickness radially of the tubes towards the tube ends from a maximum thickness greater than the initial wall thickness.

9. The means as claimed in claim 8 which further comprises a heat resistant tube support means positioned intermediate at least two of said forming means.

10. The machine as claimed in claim 4 which further comprises a tool carriage for said third shaping means, means for mounting the carriage for combined movement generally axially and laterally of the tubes, and means for supporting said third shaping means on said carriage in position for at least partially entering the hollow center of the tubes.

11. The machine as claimed in claim 10 which further comprises a reversible drive means for moving said carriage axially of the tubes, and a cam for moving said carriage transversely of said tubes.

12. The machine as claimed in claim 4 which further comprises a tool carriage for said third shaping means, means for mounting the carriage for combined movement generally axially and laterally of the tubes, drive means for said carriage, means for supporting said second shaping surface on said carriage in position for entering the center of the tubes, means including said pivots for mounting said dies on said carriage for engaging the outer walls of the tubes, and drive means on said carriage operatively coupled to said die mounting means for moving said die against the tubing walls.

13. The machine as claimed in claim 12 in which said carriage drive means comprises a reversible motor coupled to said carriage for moving it axially of said tubes, and a cam responsive to the axial movement of said carriage for moving the carriage laterally of said tubes.

14. The machine as claimed in claim 12 in which said drive means for said die mounting means comprises a motor mounted on said carriage.

15. The machine as claimed in claim 12 in which said drive means for said die mounting means comprises a motor mounted on said carriage, and cam means coupling said dies to said motor.

References Cited

UNITED STATES PATENTS

| | | | |
|---|---|---|---|
| 1,471,010 | 10/1923 | Selvig | 65—279 |
| 3,257,186 | 6/1966 | Zauner | 65—282 X |
| 3,293,018 | 12/1966 | Doty | 65—277 |

FOREIGN PATENTS 731,765   6/1955   Great Britain.

ARTHUR D. KELLOGG, Primary Examiner

U.S. Cl. X.R.

65—282, 296, 299